(12) United States Patent
Richmond et al.

(10) Patent No.: US 8,151,596 B2
(45) Date of Patent: Apr. 10, 2012

(54) SENSOR SYSTEM FOR A REFRIGERATOR DISPENSER

(75) Inventors: Peter J. Richmond, Berrien Springs, MI (US); Bob A. Ghent, St. Joseph, MI (US); Chad Lange, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 900 days.

(21) Appl. No.: 11/937,214

(22) Filed: Nov. 8, 2007

(65) Prior Publication Data
US 2008/0156008 A1 Jul. 3, 2008

Related U.S. Application Data

(60) Provisional application No. 60/877,668, filed on Dec. 29, 2006.

(51) Int. Cl.
*F25D 29/00* (2006.01)
(52) U.S. Cl. ............................. 62/391; 62/389
(58) Field of Classification Search ................... 62/178, 62/391
See application file for complete search history.

(56) References Cited

U.S. PATENT DOCUMENTS

| | | |
|---|---|---|
| 3,823,846 A | 7/1974 | Probst |
| 4,099,167 A | 7/1978 | Pomerantz et al. |
| 4,121,433 A | 10/1978 | Pomerantz |
| 4,202,387 A | 5/1980 | Upton |
| 4,266,144 A | 5/1981 | Bristol |
| 4,295,370 A | 10/1981 | Bristol |
| 4,437,497 A | 3/1984 | Enander |
| 4,437,499 A | 3/1984 | Devale |
| 4,446,896 A | 5/1984 | Campagna |
| 4,458,735 A | 7/1984 | Houman |
| 4,559,979 A | 12/1985 | Koblasz et al. |
| 4,572,253 A | 2/1986 | Farmer et al. |
| 4,733,381 A | 3/1988 | Farmer et al. |
| 4,780,861 A | 10/1988 | Stembridge et al. |
| 4,798,232 A | 1/1989 | Stembridge et al. |
| 4,817,689 A | 4/1989 | Stembridge et al. |
| 4,883,100 A | 11/1989 | Stembridge et al. |
| 4,890,651 A | 1/1990 | Stembridge et al. |
| 4,917,155 A | 4/1990 | Koblasz et al. |
| 4,944,335 A | 7/1990 | Stembridge et al. |
| 4,961,456 A * | 10/1990 | Stembridge et al. ............ 141/1 |

(Continued)

FOREIGN PATENT DOCUMENTS
DE 19949612 A1 6/2001
(Continued)

*Primary Examiner* — Cheryl J Tyler
*Assistant Examiner* — Jonathan Bradford
(74) *Attorney, Agent, or Firm* — Kirk W. Goodwin; Diederiks & Whitelaw, PLC

(57) ABSTRACT

A refrigerator includes a dispenser, a dispenser well, a control for regulating a dispensing operation, and a sensor system for automatically initiating and terminating the dispensing operation. The sensor system includes at least one capacitive-type sensor mounted in the dispenser well. The sensor is configured to detect the presence of a container in the dispenser well, an upper edge portion of the container and a level of liquid filling the container during the dispensing operation. The sensor signals the control to automatically cease the dispensing operation before the level of liquid reaches the upper edge portion of the container. The control is configured to differentiate between animate and inanimate objects, while preventing any release of water or ice when an animate object is detected.

20 Claims, 3 Drawing Sheets

U.S. PATENT DOCUMENTS

| | | | |
|---|---|---|---|
| RE33,435 E | 11/1990 | Koblasz et al. | |
| 4,994,336 A | 2/1991 | Benecke et al. | |
| 5,017,909 A | 5/1991 | Goekler | |
| 5,036,892 A | 8/1991 | Stembridge et al. | |
| 5,406,843 A | 4/1995 | Hannan et al. | |
| 5,460,007 A | 10/1995 | Reed et al. | |
| 5,491,333 A | 2/1996 | Skell et al. | |
| 5,491,423 A | 2/1996 | Turetta | |
| 5,550,369 A | 8/1996 | Skell et al. | |
| 5,551,598 A | 9/1996 | Cutsinger | |
| 5,573,041 A | 11/1996 | Skell et al. | |
| 5,744,793 A | 4/1998 | Skell et al. | |
| 5,819,547 A | 10/1998 | Oh | |
| 5,862,844 A | 1/1999 | Perrin | |
| 6,046,447 A | 4/2000 | Skell et al. | |
| 6,082,419 A | 7/2000 | Skell et al. | |
| 6,227,265 B1 | 5/2001 | Skell et al. | |
| 6,265,709 B1 | 7/2001 | Olson et al. | |
| 6,337,959 B1 | 1/2002 | Kwak et al. | |
| 6,394,153 B2 | 5/2002 | Skell et al. | |
| 6,528,781 B1 | 3/2003 | Olson et al. | |
| 6,539,797 B2 | 4/2003 | Livingston et al. | |
| 6,681,585 B1 * | 1/2004 | Stagg et al. | 62/177 |
| 6,688,134 B2 | 2/2004 | Barton et al. | |
| 6,705,356 B2 | 3/2004 | Barton et al. | |
| 6,761,284 B2 | 7/2004 | Knepler | |
| 6,766,687 B2 | 7/2004 | Florenz et al. | |
| 6,789,585 B1 | 9/2004 | Janke | |
| 6,823,730 B2 | 11/2004 | Buck et al. | |
| 6,840,100 B1 * | 1/2005 | Wotiz | 73/149 |
| 6,912,870 B2 | 7/2005 | Gnadinger | |
| 6,988,405 B2 | 1/2006 | Jakoby et al. | |
| 7,028,725 B2 | 4/2006 | Hooker | |
| 7,353,850 B2 * | 4/2008 | Greiwe et al. | 141/279 |
| 2001/0037680 A1 * | 11/2001 | Buck et al. | 73/304 C |
| 2004/0226962 A1 | 11/2004 | Mazursky et al. | |
| 2005/0072228 A1 * | 4/2005 | Jakoby et al. | 73/304 C |
| 2005/0138951 A1 | 6/2005 | Hooker | |
| 2005/0268624 A1 * | 12/2005 | Voglewede et al. | 62/126 |
| 2005/0268639 A1 | 12/2005 | Hortin et al. | |
| 2006/0054724 A1 * | 3/2006 | Matlin et al. | 241/37.5 |
| 2006/0196212 A1 | 9/2006 | Jenkins, Jr. et al. | |

FOREIGN PATENT DOCUMENTS

| | | |
|---|---|---|
| EP | 1521066 | 9/2004 |
| JP | 07-067892 | 9/1995 |
| JP | 2002-100976 | 4/2002 |
| JP | 2005-263278 | 9/2005 |

* cited by examiner

SENSOR SYSTEM FOR A REFRIGERATOR DISPENSER

CROSS-REFERENCE TO RELATED APPLICATION

The present application claims the benefit of U.S. Provisional Patent Application Ser. No. 60/877,668 filed Dec. 29, 2006 entitled "Sensor System for a Refrigerator Dispenser."

BACKGROUND OF THE INVENTION

1. Field of the Invention

The present invention pertains to the art of refrigerators and, more particularly, to a sensor system employed in a dispenser mounted in a refrigerator door.

2. Description of the Related Art

Refrigerators having built-in ice/water dispensers are well known in the art. In general, the dispensers are mounted to a door of the refrigerator for the purpose of dispensing ice and/or water without requiring a user to access a refrigerator compartment. A typical dispenser includes a dispenser well into which a container is placed. Once the container is in position, an actuator is operated to release the ice and/or water into the container.

In many cases, the actuator is a pressure sensitive mechanical switch. Typically, the switch is operated by pushing the container against, for example, a lever. The lever, in turn, operates the switch that causes the ice and/or water to be dispensed. A number of dispensers employ multiple actuators, one for ice and another for water, while other dispensers employ a single actuator. Dispensers which employ a single actuator typically require additional control elements that enable a user to select between ice and water dispensing operations. Several manufacturers have converted from mechanical switches to electrical or membrane switches. Functioning in a similar manner, a container is pushed against the membrane switch to initiate the dispensing operation. Still other arrangements employ actuator buttons provided on a control panel of the dispenser. With this arrangement, the user continuously depresses a button to release ice and/or water into the container. In yet another arrangement, ultrasonic sensors are mounted in the dispenser well and function to sense a presence and size of the container. The dispenser automatically begins dispensing ice or water based on the presence of the container and stops dispensing before the container overfills.

Over time, mechanical and membrane switches wear out. Physical interaction with the switches results in wear and tear on contact points, springs, levers and the like which eventually require replacement. In addition, buttons, switches and sensors not only add to the overall cost and complexity of the system, but often poses an attraction to young children. Ever curious, young children will often play with the dispenser controls and release water and/or ice onto kitchen floors. In order to address this problem, several manufactures provide their dispensers with a "Lock-Out" feature which, when active, disables operation of the dispenser. While effective, consumers often don't want to turn the system on and off as needed. As such, users do not routinely avail themselves of this option.

Another drawback with existing systems is the lack of an automatic cut-off feature. More specifically, once activated, the dispenser will discharge water or ice until the pressure is removed from the actuator. If the user is momentarily distracted or if the dispenser is operated by an inexperienced individual such as a child, the level of ice or water can overflow the container. There also exist drawbacks with the systems that employ automatic actuators. Most active sensors cannot differentiate between a container and a child's hand. Thus, in such systems, the mere act of a child inserting a hand or other object into the dispenser well will initiate a dispensing operation. In addition, active sensors require both the sending and receiving of signals. Sensors of this type may require periodic alignment and necessitate the use of multiple components which further adds to the overall cost and complexity of the appliance.

Therefore, despite the existence of refrigerator dispensers in the prior art, there still exists a need for an enhanced refrigerator dispensing system. More specifically, there exists a need for a refrigerator dispensing system that employs passive-type sensors, such as capacitive sensors, which do not require contact by a container or other device to initiate a dispensing operation, yet automatically terminate a dispensing operation when a level of ice or water reaches an upper rim of the container. In addition, there exists a need for a refrigerator dispensing system which automatically differentiates between animate and inanimate objects to prevent inadvertent dispensing operations.

SUMMARY OF THE INVENTION

The present invention is directed to a refrigerator including a cabinet within which is defined at least one refrigerated compartment. A door is pivotally mounted to the cabinet to provide access to the refrigerated compartment. A dispenser assembly is provided in the door to enable users to obtain ice and/or water without requiring access to the refrigerated compartment. The dispenser includes a main body portion, a control portion including a plurality of control elements for selecting a desired dispensing operation, a dispenser well provided in the main body portion, and a sensor system.

In accordance with the invention, the sensor system includes at least one passive sensor that is mounted in the dispenser well. The sensor is configured to detect an upper edge portion of a container placed in the dispenser well and a level of liquid filling the container during a dispensing operation. The sensor signals the control to automatically terminate the dispensing operation before the level of liquid in the container reaches the upper edge portion.

In accordance with another aspect of the invention, the sensor system is also configured to detect when a container is introduced into the dispenser well and automatically trigger a dispensing operation. More specifically, upon sensing that a container is positioned in the dispenser well, the control automatically begins releasing water or ice into the container based upon user preferences. In addition to sensing the presence of a container, the control is also configured to differentiate between animate and inanimate objects. More specifically, the control automatically initiates a dispensing operation only upon sensing an inanimate object, e.g. a container, in the dispenser well. In the event that an animate object, such as a child's hand or the like, is introduced into the dispenser well, the control does not release the water or ice.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF PREFERRED EMBODIMENTS

Figure 1:
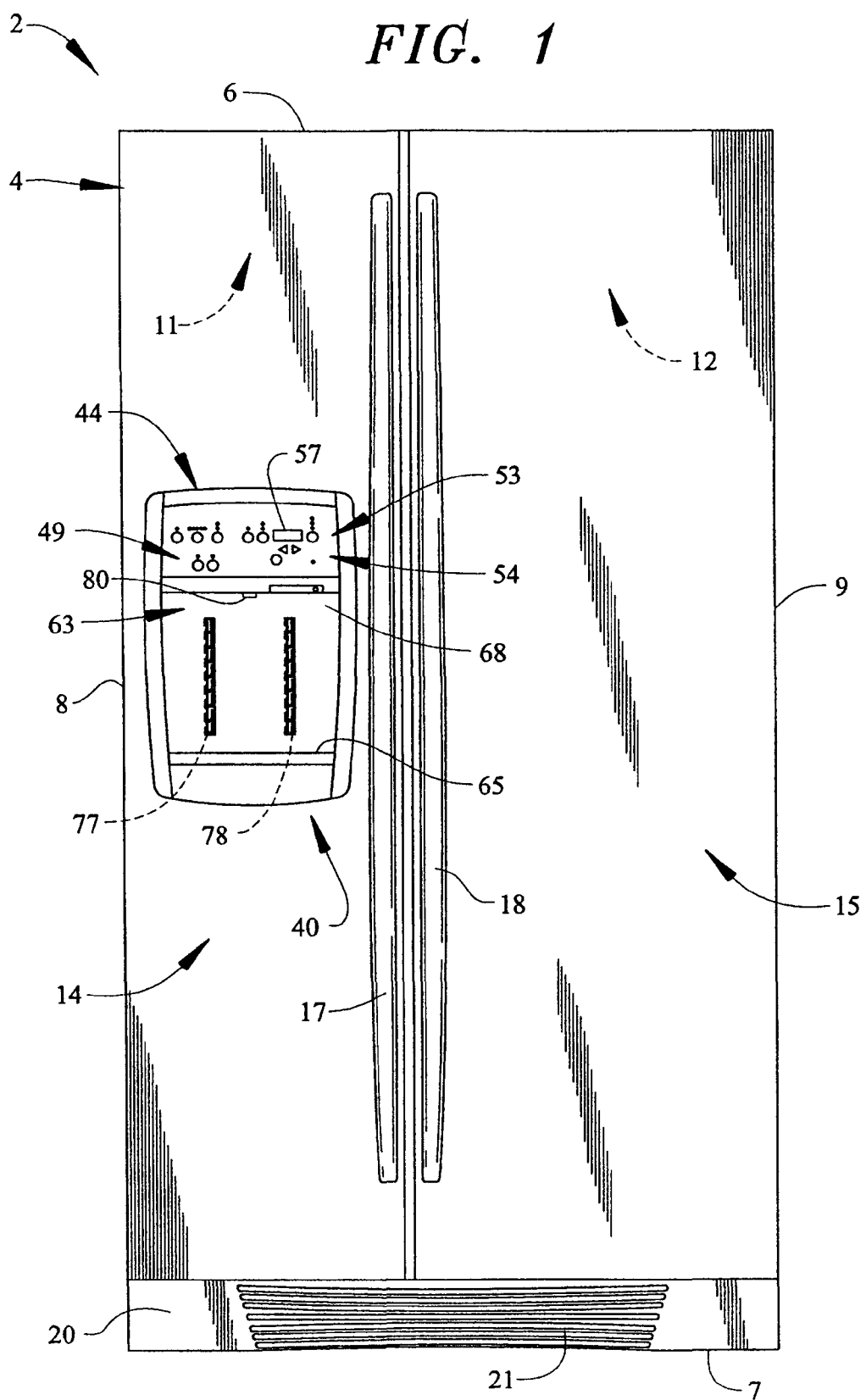
FIG. 1 is a front elevational view of a refrigerator incorporating a dispenser having a sensor system constructed in accordance with the present invention.

With initial reference to FIG. 1, a refrigerator constructed in accordance with the present invention is generally indicated at 2. Refrigerator 2 includes a cabinet 4 having a top wall 6, a bottom 7 and opposing side walls 8 and 9. In a manner known in the art, refrigerator 2 includes a freezer compartment 11 arranged along side a fresh food compartment 12. Freezer compartment 11 includes a corresponding freezer compartment door 14 and fresh food compartment 12 includes a corresponding fresh food compartment door 15. In a manner also known in the art, each door 14, 15 includes an associated handle 17, 18. Refrigerator 2 is also shown to include a kick plate 20 arranged at a bottom portion thereof having a vent 21 that permits air to flow into refrigeration components (not shown) that establish and maintain desired temperatures in freezer compartment 11 and fresh food compartment 12. In the embodiment shown, refrigerator 2 constitutes a side-by-side model. However, it should be understood that the present invention could also be employed in connection with a wide variety of refrigerators, including top mount, bottom mount, and French-style refrigerator models.

In accordance with the invention, refrigerator 2 includes a dispenser assembly 40 having a main housing 44 and a control panel 49. Control panel 49 includes first and second rows of control buttons 53 and 54 which enable a user to select a preferred dispensing operation. Control panel 49 further includes a display 57 which, in addition to functioning in cooperation with dispenser assembly 40, enables the user to select particular operational parameters for refrigerator 2, such as desired temperatures for freezer compartment 11 and fresh food compartment 12. In any case, dispenser assembly 40 includes a dispenser well 63 having a base or container support portion 65 and a recessed, upstanding wall section 68. A pair of passive sensors 77 and 78 that are concealed by the upstanding wall section 68, as will be discussed more fully below, control dispensing operations as selected by a user. More specifically, sensors 77 and 78 operate, upon sensing a container 79 (FIG. 3), to automatically activate a valve (not shown) to release water through a spout 80 or an auger mechanism (not shown) to release ice cubes.

Figure 2:
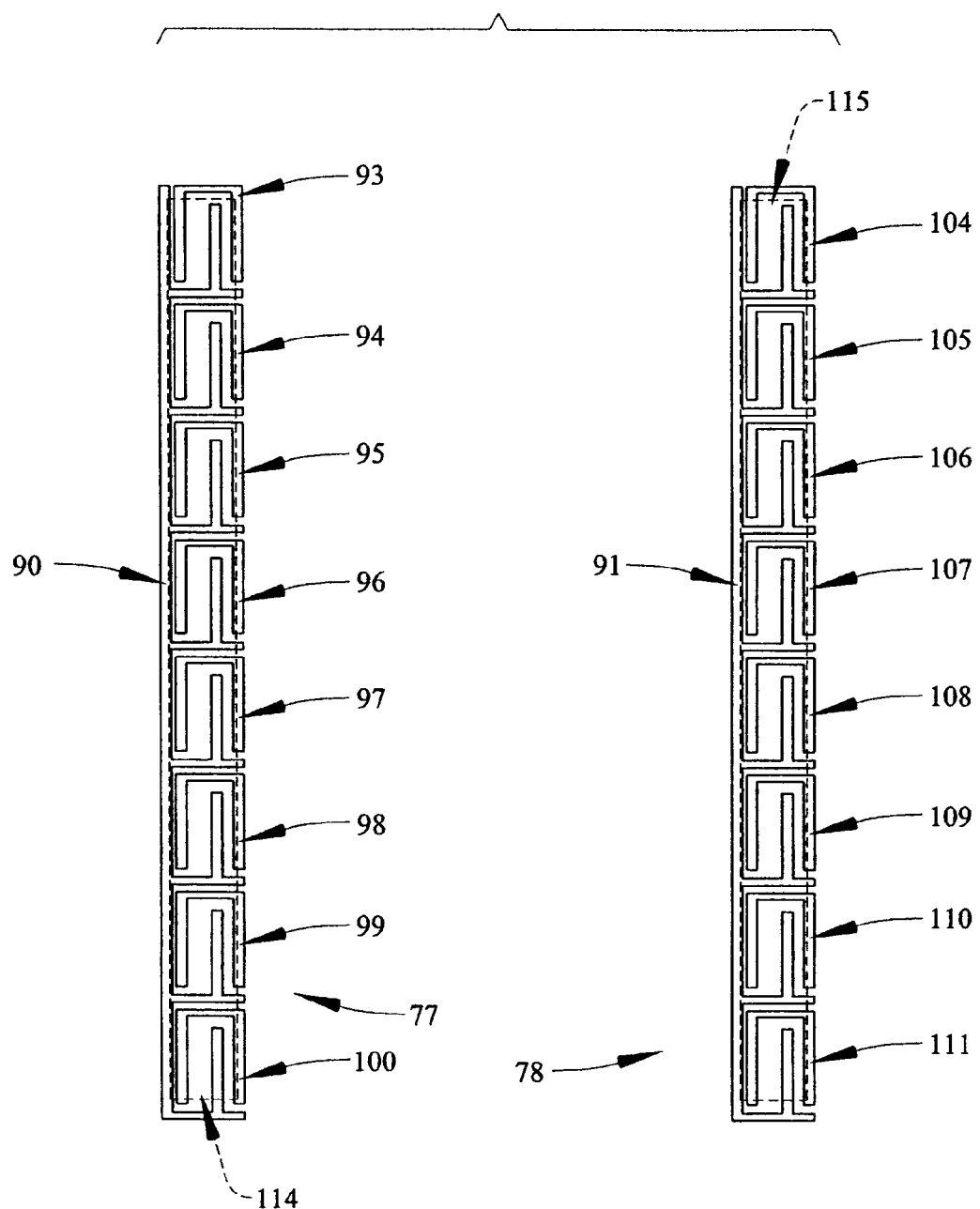
FIG. 2 is an elevational view of the sensor system of the present invention.
Figure 3:
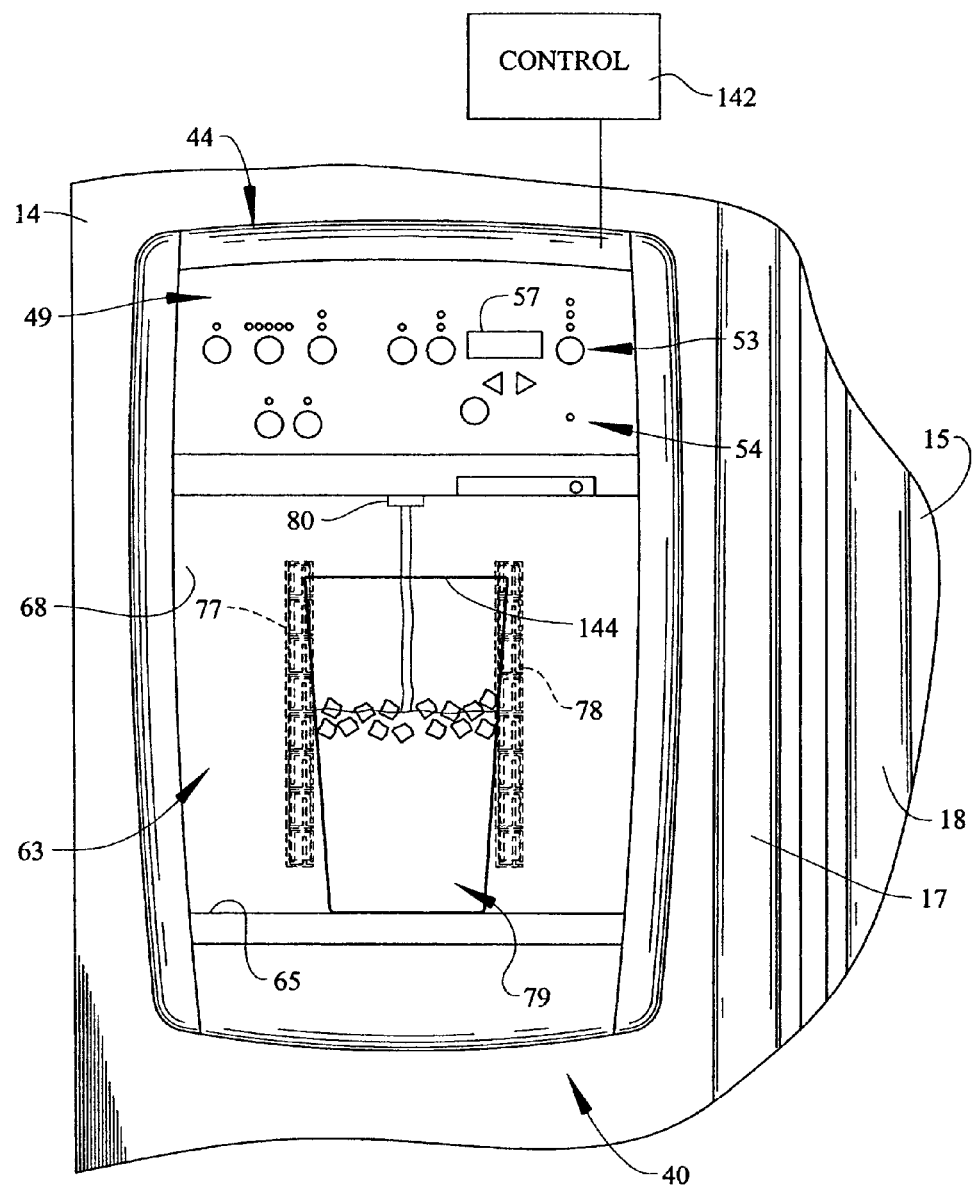
FIG. 3 is an enlarged view of the dispenser of FIG. 1 illustrating a dispensing operation in accordance with the present invention.

As stated above, sensors 77 and 78 are passive in nature. That is, in contrast to active sensors, such as ultrasonic, infrared, optical sensors or the like which require both the transmission and receipt of signals, sensors 77 and 78 passively sense the presence of, for example, a container in dispenser well 63. Most preferably, sensors 77 and 78 are capacitive-type sensors which sense changes in a dielectric constant of materials brought into proximity of back wall section 68 (sensing zones) 114 and 115. As higher dielectric constants register larger changes in capacitance, the present invention maximizes the detected change in capacitance when a container is brought into proximity of back wall section 68 (sensing zones) 114 and 115 by providing sensors 77 and 78 with corresponding common metal strips 90 and 91, as well as a series of sensor strips 93-100 and 104-111 as best shown in FIG. 2. Sensor strips 93-100 and 104-111, in combination with corresponding ones of common metal strips 90 and 91, establish a plurality of discrete sensing zones (not separately labeled) which collectively establish respective sensing zones 114 and 115 as indicated by dotted lines in FIG. 2 for sensors 77 and 78 respectively. By employing multiple sensor strips, the size of each sensor 77, 78 is minimized. This is particularly advantageous given that the smaller the sensor, the higher the relative change when a container or other similar inanimate object is brought into proximity. As shown in FIG. 3, as container 79 is placed in dispenser well 63, a control 142 monitors the capacitance of each sensor strip 93-100 and 104-111 for changes which signal the presence and/or removal of container 79 anywhere proximate to sensing zones 114 and 115. It should be noted that the shape, size and configuration or layout of the sensor strip should not be limited to that illustrated in FIG. 2, as this is merley a potential embodiment.

In addition to sensing the presence of container 79, sensors 77 and 78 determine a position of container 79 in dispenser well 63 by detecting an upper rim portion 144 thereof. In contrast to the prior art which would be capable of detecting a height of a container relative to a bottom wall of the dispenser, the present invention detects the actual location of upper rim portion 144 of container 79. Thus, in the prior art, if a container where held above the bottom wall, overfilling could still occur as the control would register that a taller container was being used. This is not the case with the present invention given that dispensing terminates before the liquid reaches the upper rim as will be detailed more fully below. In any event, when container 79 is placed within dispenser well 63, a change in capacitance is detected. The change in capacitance is greatest in those sensing strips 93-100 and 104-111 directly adjacent container 79. Any one of sensing strips 93-100 and 104-111 located above container 79 will exhibit little or no change. In this manner, control 142 monitors the capacitance in each sensor strip 93-100 and 104-111 and determines not only the presence of container 79 but also the position of upper rim portion 144.

After detecting the presence of container 79 and the location of upper rim portion 144, water is automatically dispensed into container 79. As the dielectric constant of water is much greater than most empty containers, including glass and plastic drinking containers, the dielectric constant of the liquid will have an additive effect on the capacitance of each sensor strip 93-100 and 104-111. Thus, as the level of water continues to rise in container 79, the capacitance of, for example, sensor strip 106 changes proportionally with the water height. Once the water is above the top of sensor strip 106, the capacitance associated therewith ceases to change or, at best, will change very little. In this manner, control 142 can readily determine the location of the water relative to upper rim portion 144 by monitoring the change of capacitance of each sensing strip 93-100 and 104-111. This arrangement provides a high degree of accuracy, while still permitting the use of a relatively minimum number of sensor strips. Thus, in accordance with the most preferred form of the invention, control 142 initiates a dispensing operation upon receipt of a signal indicating the presence of container 79, and control 142 will continue the dispensing of either water from spout 80 and/or ice through a chute (not shown) until the fill level is a predetermined spacing, such as one inch (approximately 2.5 cm), from upper rim 144 of container 79, at which point the dispensing operation is automatically terminated.

In addition to the above, sensors 77 and 78 also act as a safety feature for dispenser assembly 40. More specifically, sensors 77 and 78 can differentiate between animate and inanimate objects. That is, using the theory that animate objects tend to reduce an amount of charge stored on a capacitor rather than increase the charge, sensors 77 and 78 are able to differentiate between a container and, for example, a hand.

In the event that a hand or other animate object is inserted into dispenser well 63, control 142 will not initiate a dispensing operation. Thus, if a child or inexperienced user simply inserts a hand, rather than a container, into dispenser well 63, water will not be dispensed from dispenser assembly 40 and fall onto a kitchen floor surface.

At this point, it should be understood that the present invention provides for an easily manufactured and efficient passive sensor array that automates a refrigerator dispenser assembly. The sensor array in accordance with present invention, not only serves to automatically initiate a dispensing operation upon sensing the presence of a container, but detects a location of an upper rim portion of the container and fills the container to a level below the rim. In addition, by being able to differentiate between animate and inanimate objects, the present invention automatically creates a "child lock-out" feature which operates continuously without creating an inconvenience for other users. Finally, by employing passive sensors instead of active sensors, power requirements for the dispensing assembly are reduced, along with the number of components necessary to activate and control the dispensing of water and/or ice cubes from the dispenser.

Although described with reference to a preferred embodiment of the invention, it should be readily understood that various changes and/or modifications can be made to the invention without departing from the spirit thereof. For instance, while the invention is shown with two sensor strips each having eight sensors, various other configurations can also be employed. Also, while described as employing capacitive-type sensors, other forms of passive sensors could also be utilized. In general, the invention is only intended to be limited by the scope of the following claims.

What is claimed is:

1. A refrigerator comprising:
   a cabinet;
   at least one refrigerated compartment arranged within the cabinet;
   a door mounted to the cabinet for selectively providing access to the at least one refrigerated compartment; and
   a dispenser assembly provided in the door for selectively releasing at least one of water and ice to a consumer, said dispenser assembly including:
      a main body portion;
      a control portion provided on the main body portion, said control portion including a plurality of control elements for selecting a desired dispensing operation;
      a dispenser well provided in the main body portion, said dispenser well including a base section and an upstanding wall section;
      a control operatively connected to the plurality of control elements for regulating the dispensing operation; and
      a sensor system including at least one passive sensor mounted along the wall section of the dispenser well, said at least one passive sensor being configured to detect a container placed within the dispensing well, an upper rim portion of the container and a level of the at least one of water and ice released into the container during the dispensing operation, said control automatically initiating a dispensing operation based on the presence of the container in the dispenser well and thereafter automatically terminating the dispensing operation before the level of liquid reaches the upper rim portion of the container.

2. The refrigerator according to claim 1, wherein the at least one passive sensor is constituted by a capacitive-type sensor.

3. The refrigerator according to claim 2, wherein a capacitive-type sensor includes a plurality of capacitive plates.

4. The refrigerator according to claim 3, wherein the plurality of capacitive plates are arranged in a substantially vertical row extending along the wall section of the dispenser well.

5. The refrigerator according to claim 3, wherein the plurality of capacitive plates are interconnected by a common metal strip.

6. The refrigerator according to claim 1, wherein the at least one passive sensor is constituted by at least one capacitive strip, said at least one capacitive strip including a plurality of discrete sensing zones.

7. The refrigerator according to claim 6, wherein the at least one capacitive strip extends substantially vertically along the wall section of the dispenser well.

8. The refrigerator according to claim 7, wherein the at least one capacitive strip is constituted by first and second capacitive strips extending substantially vertically, at spaced locations, along the wall section of the dispenser well.

9. A refrigerator comprising:
   a cabinet;
   at least one refrigerated compartment arranged within the cabinet;
   a door mounted to the cabinet for selectively providing access to the at least one refrigerated compartment; and
   a dispenser assembly provided in the door for selectively releasing at least one of water and ice to a consumer, said dispenser assembly including:
      a main body portion;
      a dispenser well provided in the main body portion, said dispenser well including a base section and an upstanding wall section;
      means for sensing a container in the dispensing well for initiating a dispensing operation;
      means for passively sensing an upper edge portion of the container placed within the dispenser well;
      means for passively detecting a level of the at least one of water and ice released into the container during the dispensing operation; and
      means for automatically terminating the dispensing operation before the level of liquid in the container reaches the upper edge portion.

10. The refrigerator according to claim 9, further comprising: means for differentiating between an animate object and an inanimate object introduced into the dispenser well, said differentiating means preventing automatic initiation of the dispensing operation if the object introduced into the dispenser well is an animate object.

11. The refrigerator according to claim 9, wherein the sensing means is constituted by at least one capacitive-type sensor having a plurality of capacitive plates.

12. The refrigerator according to claim 11, wherein the plurality of capacitive plates are arranged in a substantially vertical row extending along the wall section of the dispenser well.

13. The refrigerator according to claim 12, wherein the plurality of capacitive plates are interconnected by a common metal strip.

14. The refrigerator according to claim 11, wherein the at least one capacitive-type sensor is constituted by at least one capacitive strip, said at least one capacitive strip including a plurality of discrete sensing zones.

15. The refrigerator according to claim 14, wherein the at least one capacitive strip extends substantially vertically along the wall section of the dispenser well.

16. The refrigerator according to claim 14, wherein the detecting means is constituted by another capacitive strip mounted in the dispenser well.

17. The refrigerator according to claim 16, wherein the at least one capacitive strip and the another capacitive strip extend substantially vertically, at spaced locations, along the wall section of the dispenser well.

18. A method of dispensing a liquid from a refrigerator door mounted dispenser assembly including a dispensing well comprising:
   passively sensing a presence of a container in the dispensing well;
   passively sensing an upper edge portion of the container;
   automatically initiating a dispensing operation by introducing at least one of water and ice into the container when the presence of the container is sensed in the dispenser well;
   detecting a fill level associated with the dispensing operation; and
   automatically terminating the dispensing operation before the fill level reaches the upper edge portion of the container.

19. The method of claim 18, wherein passively sensing a presence of the container includes differentiating between an animate object and an inanimate object introduced into the dispenser well, said dispensing operation only preceding when an inanimate object is detected.

20. The method of claim 18, wherein the passive sensing employed in the dispensing method is performed with a pair of spaced, substantially vertically extending capacitive sensor arrays mounted at spaced locations within the dispenser well portion of the door.

* * * * *